US012725089B1

(12) United States Patent
Antebi et al.

(10) Patent No.: US 12,725,089 B1
(45) Date of Patent: Sep. 1, 2026

(54) SPECULATIVE RETRIEVAL PROXY FOR RETRIEVAL AUGMENTED GENERATION

(71) Applicant: INTUIT INC., Mountain View, CA (US)

(72) Inventors: Sagiv Antebi, Tel Aviv (IL); Matan Vetzler, 'Givat Shmuel (IL); Ofir Ben Shoham, Giv'atayim (IL); Shai Ardazi, Petah Tikva (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/545,835

(22) Filed: Feb. 20, 2026

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC ........................................................ G06N 5/04
See application file for complete search history.

(56) References Cited

U.S. PATENT DOCUMENTS

2025/0299026 A1* 9/2025 Imanigooghari ....... G06F 40/30
2025/0335701 A1* 10/2025 Xu ........................ G06F 40/186
2026/0065098 A1* 3/2026 Bitar ........................ G06N 5/04
2026/0065143 A1* 3/2026 Agrawal ................ G06N 20/00
2026/0105741 A1* 4/2026 Rathi ................... G06V 10/993
2026/0111467 A1* 4/2026 Ke ...................... G06F 16/3344

OTHER PUBLICATIONS

Zhang, Yunxiang, et al. "Merging generated and retrieved knowledge for open-domain QA." Proceedings of the 2023 Conference on Empirical Methods in Natural Language Processing. 2023. (Year: 2023).*

* cited by examiner

*Primary Examiner* — Hal Schnee
(74) *Attorney, Agent, or Firm* — Patterson + Sheridan, LLP

(57) ABSTRACT

Aspects of the present disclosure involve efficient retrieval-augmented generation. Aspects include generating, by a first machine learning model based on a query and a knowledge corpus, a draft context comprising candidate knowledge items, and a first sufficiency score indicating a likelihood that the draft context is sufficient for the query. Aspects include generating, by a second machine learning model, based on the query and the draft context, a second sufficiency score indicating a corresponding likelihood that the draft context is sufficient for the query. Aspects include performing, based on the second sufficiency score and the first sufficiency score, one of: selecting the draft context as a generation context; or performing a comprehensive retrieval augmented generation process using the knowledge corpus to determine an alternative context for the query and selecting the alternative context as the generation context. Aspects include generating a response to the query based on the generation context.

18 Claims, 5 Drawing Sheets

SPECULATIVE RETRIEVAL PROXY FOR RETRIEVAL AUGMENTED GENERATION

INTRODUCTION

Aspects of the present disclosure relate to efficient retrieval-augmented generation, and more specifically, to a process involving a dynamic combination of speculative retrieval and large-model verification with sufficiency-based gating for resource-efficient, accuracy-preserving contextual generation.

BACKGROUND

Retrieval-augmented generation systems combine generative models with external knowledge sources to improve factuality and coverage. In typical deployments, a user query is encoded and used to retrieve top-k items from a large corpus, such as document stores, knowledge bases, or indexed web content. Dense vector search over high-dimensional embeddings, often supplemented by lexical features and metadata, is commonly employed to locate relevant passages. After retrieval, the selected items are provided along with the user query to a generative model to produce a response conditioned on the retrieved context.

While effective, these pipelines face practical constraints. Large-scale index scans introduce latency, particularly with large knowledge bases or when similarity computations require significant computation. Fixed top-k strategies may retrieve more content than necessary, increasing costs and potentially crowding the context window. Conversely, aggressive pruning can omit useful material, leading to degraded answer quality. Confidence estimation in conventional pipelines is typically coarse, relying on static thresholds, heuristic scores, or retriever similarity metrics that do not consistently reflect whether the retrieved set is sufficient to answer a specific query. Moreover, re-ranking stages and fallback mechanisms add complexity and may still provide limited visibility into query-level sufficiency versus document-level utility.

Operational environments with high query throughput are especially sensitive to latency and compute budgets. In these settings, systems benefit from mechanisms that balance responsiveness with reliability, account for heterogeneous document types and sizes, and respect constrained context windows. Additionally, continuous update cycles and evolving corpora can shift retrieval distributions, challenging static configurations and increasing the need for calibrated uncertainty estimates and robust decision policies regarding when and how much retrieval should be performed.

Accordingly, there is a need in the art for improved techniques for retrieval-augmented generation.

BRIEF SUMMARY

According to an aspect of the present disclosure, a method for efficient retrieval-augmented generation is provided. The method may include: generating, by a first machine learning model based on a query and knowledge item attributes from a knowledge corpus: a draft context comprising candidate knowledge items from the knowledge corpus; and a first sufficiency score indicating a likelihood that the draft context is sufficient for the query; generating, by a second machine learning model having a larger number of parameters than the first machine learning model, based on the query and the draft context, a second sufficiency score indicating a corresponding likelihood that the draft context is sufficient for the query; performing, based on evaluating the second sufficiency score relative to the first sufficiency score, one of: selecting the draft context as a generation context; or performing a comprehensive retrieval augmented generation process using the knowledge corpus to determine an alternative context for the query and selecting the alternative context as the generation context; and generating a response to the query using a generative machine learning model based on the generation context.

According to other aspects, a non-transitory computer readable medium may store instructions that, when executed by one or more processors of a computing system, cause the computing system to perform one or more of the methods set forth above. According to other aspects, a system includes one or more processors and a memory storing instructions that, when executed by the one or more processors, cause the system to perform aspects of one or more of the methods set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
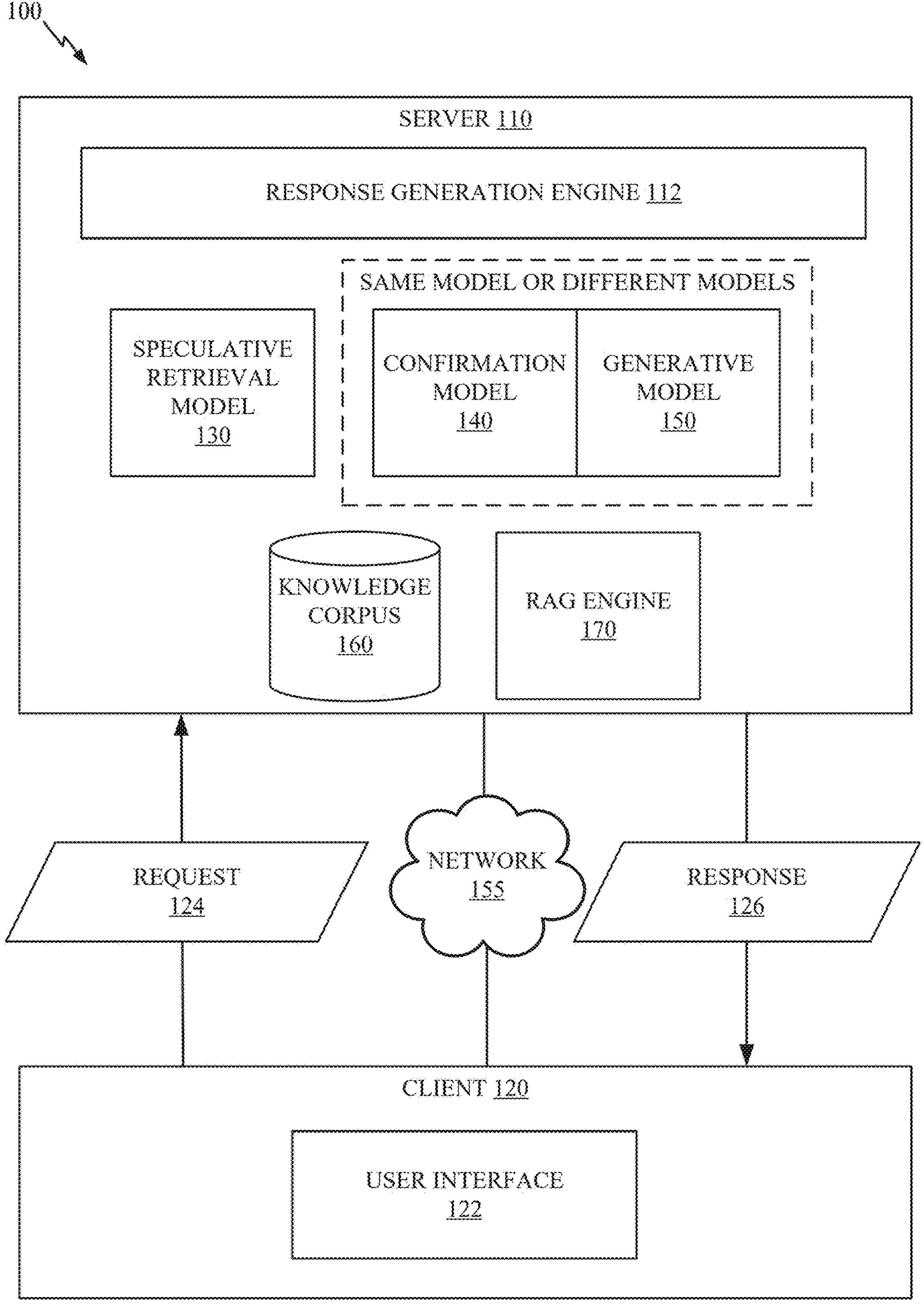
FIG. 1 illustrates a block diagram of a computing environment efficient retrieval-augmented generation, according to aspects of the present disclosure.

The present disclosure relates to a method and system for efficient retrieval-augmented generation. For example, techniques described herein provide a retrieval-augmented generation pipeline that reduces latency and compute while preserving answer quality through a two-stage sufficiency assessment. A lightweight speculative model proposes a compact draft context and quantifies whether that context is likely to be sufficient for the query. A larger verifier model, optionally the same language processing machine learning model that will generate the final response, assesses the same draft context without initiating additional retrieval and produces a second sufficiency judgment for the draft context. The pipeline compares these sufficiency assessments and either proceeds with the draft context or triggers a comprehensive retrieval procedure only when warranted. This approach replaces static, document-level heuristics with calibrated, query-level sufficiency gating.

Prior systems typically perform full retrieval for every query, scan large vector indices, re-rank broad candidate sets, and rely on coarse similarity thresholds for individual items or hand-tuned rules. These practices increase latency, expand compute costs, and risk overfilling context windows with marginally useful material. Techniques described herein introduce a speculative retrieval proxy (e.g., lightweight model) that mimics top-k behavior of a primary retriever and produces calibrated uncertainty both at the query level and, in some aspects, at the document level. By constraining the verifier (e.g., a larger model) to operate on the proposed draft context and the query alone, without performing a more comprehensive retrieval at this stage, the system avoids unnecessary index access during verification and achieves a clean separation between fast speculation and confirmatory evaluation.

Technically, the pipeline improves efficiency by decoupling proposal and verification and by allowing safe early exits. The speculative model selects candidate knowledge items based on corpus attributes such as titles, snippets, embeddings, and/or partition identifiers, and computes a first sufficiency score reflecting whether the selected items should be enough to answer the query. The verifier computes a second sufficiency score over the same draft context. When the verifier's score meets a configured relation to the speculative score, the system proceeds directly to generation conditioned on the draft context, thereby bypassing full retrieval. Otherwise, the system performs a comprehensive retrieval operation (e.g., dense vector search with optional re-ranking) to assemble an alternative context for generation.

Aspects of the present disclosure further introduce adaptive decision policies that account for service constraints and evolving corpora. Thresholds applied to the sufficiency comparison can be tuned based on latency budgets, cost targets, or quality requirements, and the speculative model can output a variable number of items up to a configurable maximum to respect context limits. Continuous feedback from downstream responses and user acceptance/rejection can be incorporated to refine the speculative model's calibration and to maintain alignment with the verifier's judgments as content distributions shift. This adaptive behavior provides robust control over retrieval processes without degrading accuracy.

Architecturally, techniques described herein integrate cleanly with existing retrieval-augmented generation (RAG) stacks. A query encoder may produce dense vectors and optional metadata features that can be provided as inputs to the speculative model. The verifier may optionally be the same model used for response generation, ensuring consistent reasoning over the selected context and avoiding duplication of scoring components. The pipeline may record sufficiency scores, decisions, and item identifiers for auditability and future training, enabling systematic measurement of early-exit gains and their impact on answer quality. By combining small-model speculation, large-model confirmation, and calibrated sufficiency gating, the disclosed technology delivers water-tight control over retrieval effort, lowers end-to-end latency, and maintains or improves factual performance relative to prior full-retrieval-first techniques.

Example Computing Components Related to Efficient Retrieval-Augmented Generation FIG. 1 illustrates a block diagram of a computing environment 100 related to efficient retrieval-augmented generation. The computing environment 100 may include a server 110 and a client 120 connected via a network 155.

Server 110 may comprise one or more processors and a memory storing instructions. In some cases, server 110 may be an application server or other computing device that hosts a computing application accessed by one or more users, such as via user interface 122 on client 120.

The client 120 be a computing device by which a user interacts with a computing application, and may include a user interface 122 that enables such interaction. The client 120 may send a request 124 through the network 155 to the server 110, and may receive a response 126 back through the network 155 in response. For example, request 124 may be a request for information, to perform an operation, and/or the like, such as based on input provided by a user interacting with user interface 122 (e.g., providing natural language input, interacting with a user interface element, and/or the like).

Server 110 may generate response 126 (e.g., in response to request 124) through a process that involves efficient retrieval-augmented generation (RAG) by response generation engine 112, using speculative retrieval model 130, confirmation model 140, generative model 150, and/or (in some cases) RAG engine 170. Server 110 may comprise (and/or may be connected to) a knowledge corpus 160 that stores items such as documents, records, passages, index partitions, and/or the like, and/or may attributes of such items (e.g., the attributes may be stored in knowledge corpus 160 or separately from knowledge corpus 160). In some aspects, attributes for knowledge items may include titles, short snippets, embeddings, metadata, partition identifiers, and/or the like.

For example, response generation engine 112 may orchestrate speculative retrieval, verification, retrieval fallback (as needed), and generation. In one aspect, response generation engine 112 exposes an application programming interface (API) that receives the request 124 (e.g., an API method may be invoked from client 120), parses configuration parameters such as latency budgets, costs, or maximum context length, and initializes a pipeline state.

Associated with the response generation engine 112 are machine learning models for speculative proposal, verification, and generation. A speculative retrieval model 130 is a first machine learning model configured to select a draft context from the knowledge corpus 160 and to compute a first sufficiency score indicating a likelihood that the selected draft context is sufficient to be used as context for the query. For example, response generation engine 112 may invoke speculative retrieval model 130 in order to generate a draft context for the query (e.g., request 124).

Speculative retrieval model 130 may consume a representation of the query generated by an encoder within response generation engine 112, such as a dense vector (e.g., embedding of the query) and optional metadata features including named entities or temporal expressions extracted from the query. Speculative retrieval model 130 may be smaller than one or more other models in the system (e.g., confirmation model 140 and/or generative model 150) and may be optimized for low-latency inference. In various implementations, the speculative retrieval model 130 outputs both a subset of candidate knowledge items and utility probabilities for respective knowledge items that indicate expected usefulness of the respective knowledge items for answering the query; the model may produce a variable number of knowledge items, such as up to a maximum determined by a context window budget (e.g., the budget may be associated with generative model 150).

Speculative retrieval model 130 may operate using only lightweight attributes of knowledge items, such as titles, snippets, or precomputed embeddings, and need not access full document text to generate its proposal. In some aspects, speculative retrieval model 130 is provided with such attributes as inputs (e.g., along with the query or the embedding of the query), and/or in other aspects speculative retrieval model 130 has been trained based on such attributes. In certain aspects, speculative retrieval model 130 is configured via a prompt to produce certain outputs (e.g., a draft context and a sufficiency score), such as being provided with instructions to generate such outputs based on the provided input(s) (e.g., inputs representing the query and, in some aspects, attributes of candidate knowledge items from which the model is to select items for inclusion in the draft context). Speculative retrieval model 130 may output a draft context (e.g., indicating one or more candidate knowledge items), a sufficiency score indicating a likelihood that the draft context is sufficient for the query, and (in some aspects) an individual confidence score for each of the one or more candidate knowledge items (e.g., according to instructions in the prompt).

Speculative retrieval model 130 may be a language processing machine learning model, such as a compact large language model, or as an alternative model class, such as a lightweight neural network or a tree-based model. In each case, the model consumes a representation of a query together in some aspects with lightweight attributes of corpus items, and produces a draft context and a first sufficiency score that estimates whether the draft context is likely sufficient for the query. The model may additionally emit per-item utility probabilities to prioritize items for inclusion under a configurable context budget.

In one aspect, speculative retrieval model 130 is implemented as a small language model that operates over natural-language features. The inputs can include the query text, item titles, short snippets, and optional metadata such as partition identifiers, recency tags, or entity summaries. The model may be prompted or fine-tuned to output a ranked list of items and a query-level sufficiency score. Training can proceed by supervised learning and/or fine-tuning (e.g., based on manually labeled data and/or logs from a primary retriever and downstream generation traces). For each query, target signals may include top-k items selected by the primary retriever or by an oracle pipeline, acceptance masks derived from downstream answer quality, and a binary or continuous sufficiency label indicating whether the selected subset answered the query without additional retrieval. A loss function can, in some aspects, combine next-token objectives for structured outputs with listwise or pairwise ranking losses for item ordering and a regression or calibrated classification loss for sufficiency prediction. Knowledge distillation may be used by feeding the model teacher distributions from a larger verifier or cross-encoder to align the smaller language model's utilities with high-precision scores. Post-training calibration, such as temperature scaling or isotonic regression over a validation set, can be applied to align the sufficiency score with observed success rates.

In another aspect, speculative retrieval model 130 is implemented as a lightweight neural network optimized for low-latency inference. The inputs can include dense embeddings of the query and candidate items, cosine similarities, lexical overlap statistics, compact metadata features, and/or the like. An example architecture concatenates the query embedding with item embeddings and passes them through a multilayer perceptron that outputs per-item utility probabilities. A second head aggregates item-level signals with query features to produce the query-level sufficiency score. Training uses datasets where each query is paired with candidate pools and labels indicating oracle top-k membership and sufficiency outcomes. The per-item head may be trained with cross-entropy or focal loss on positive/negative item labels and with pairwise margin losses to improve ordering, while the sufficiency head may be trained with logistic regression or mean-squared-error against sufficiency labels computed from downstream success indicators. To improve deployment-time trustworthiness, probability calibration techniques such as Platt scaling, temperature scaling, or Dirichlet calibration may be fit on held-out data to transform raw logits into calibrated utilities and sufficiency scores. The network may be further adapted online using lightweight updates, such as low-rank adapters or last-layer fine-tuning, based on recent acceptance or rejection feedback.

In a further aspect, speculative retrieval model 130 is implemented as a tree-based learner, such as gradient-boosted decision tree model. The feature vector for each candidate item may include dense-space similarities between the query and item embeddings, best matching 25 or other lexical scores, cross-features of entities and temporal expressions, partition indicators, recency and length statistics, and click-through or acceptance priors. A first boosted model may predict per-item utility probabilities, trained on labels indicating whether the item appeared in an oracle top-k or contributed to a correct downstream answer. A second boosted model may predict a query-level sufficiency score derived from pooled features, such as top-n utilities, utility variance, similarity gaps, and query features. Training may optimize logistic loss for calibrated probabilities, with early stopping on a validation set to avoid overfitting. Post-hoc calibration, such as isotonic regression on the predicted probabilities, may be applied to align predicted utilities and sufficiency scores with empirical success rates. Because tree-based models accept fixed-dimension features and have fast inference, they can be deployed where minimal latency and memory budgets are required.

Across these implementations, the selection of the draft context can be performed by sorting candidate items by predicted utility and taking as many as fit within a configured token or item budget, while the sufficiency score provides a query-level gate for early exit. Partition-level preselection can be supported by running the model on partition summaries prior to item scoring, thereby further reducing candidate sets. When the speculative model performs partition-level preselection prior to item-level scoring, the verifier may first assess sufficiency over partition summaries to determine whether evidence is concentrated within selected partitions. If the partition-level assessment indicates adequacy, the verifier proceeds to per-item verification within the chosen partitions; otherwise, the pipeline triggers comprehensive retrieval across broader partitions. This staged verification reduces latency under tight budgets while maintaining alignment between proposal and confirmation. Training corpora may be refreshed periodically to track corpus drift, and continuous feedback from downstream responses can be incorporated to update calibration parameters or to perform incremental fine-tuning without full retraining.

A confirmation model 140 is a second machine learning model, typically having a larger number of parameters than the speculative retrieval model 130, and is configured to evaluate the draft context and the query to compute a second sufficiency score. The confirmation model 140 operates without triggering additional retrieval or accessing portions of the knowledge corpus 160 beyond the draft context. In some aspects, confirmation model 140 and a generative model 150 are implemented as the same machine learning model. In other aspects, the confirmation model 140 is a distinct model from the generative model 150.

Confirmation model 140 may, for example, be implemented as a language processing machine learning model such as a large language model (LLM) configured to evaluate contextual sufficiency for a given query without initiating additional retrieval. In one embodiment, the model receives two inputs: the query text and the draft context selected by the speculative retrieval model 130, where the draft context may comprise titles, short snippets, embeddings-derived summaries, or other lightweight attributes of candidate knowledge items. Confirmation model 140 computes a second sufficiency score that estimates whether the presented context is adequate to generate a high-quality answer. Confirmation model 140 may operate strictly over the provided inputs, thereby isolating the verification step from index access and reducing latency.

In certain embodiments, confirmation model 140 and generative model 150 are instantiated by the same LLM. Verification and generation may run in two passes of the model: a "verify" pass that yields the sufficiency score using an evaluation prompt, followed by a "generate" pass that produces the final response if the sufficiency gate is satisfied. Sharing the same model between verification and generation may ensure that the model's assessment of what constitutes a sufficient context aligns with its own generation behavior, improving calibration and reducing the need for separate scoring components. In alternative aspects, the confirmation model is a verifier fine-tuned from the same base model family as generative model 150 but configured explicitly for sufficiency estimation; it may share tokenizers, positional encodings, and normalization layers with the generative model to maintain representational compatibility.

Machine learning model types suitable for confirmation model 140 and/or generative model 150 may include transformer architectures, such as with multi-head self-attention and feed-forward layers, trained on large text corpora. Pretraining of such a model commonly employs autoregressive next-token prediction, where the model learns parameters that minimize cross-entropy loss over sequences. This stage equips the model with broad linguistic and world knowledge. After pretraining, supervised fine-tuning may also be used to adapt the model to downstream tasks by optimizing on instruction-response pairs, retrieval-augmented traces, or domain-specific datasets. For confirmation model 140, training data used during an optional fine-tuning stage may include tuples of (query, draft context, label), where labels indicate whether the draft context alone led to correct answers in prior sessions. The objective can be formulated as calibrated binary classification, ordinal regression, continuous sufficiency scoring, and/or the like; auxiliary losses may encourage consistency between sufficiency predictions and subsequent generation quality.

Further alignment can be achieved using preference-based optimization, where the model learns to score contexts that resulted in accurate, concise answers higher than contexts that produced incomplete or hallucinated responses. Techniques may include reinforcement learning from human or synthetic feedback, direct preference optimization, or contrastive loss over paired sufficient/insufficient contexts. Probability calibration methods such as temperature scaling or isotonic regression can be applied on a held-out set to align the raw logits with empirical success rates, enabling threshold policies that reflect target precision-recall tradeoffs.

Operationally, confirmation model 140 may expose a compact inference interface that accepts the encoded query and a bounded-length representation of the draft context. Confirmation model 140 outputs: (i) a sufficiency score; and optionally (ii) per-item attributions indicating which draft items most strongly support the sufficiency decision. By leveraging the reasoning capacity and calibration of a large language model (e.g., having a larger number of parameters than speculative retrieval model 130), confirmation model 140 may deliver reliable, query-level sufficiency judgments that align with downstream generation behavior while avoiding unnecessary access to the broader corpus.

It is noted that the model types, architectures, and training processes described herein are included as examples, and different implementations are possible for the machine learning models used to perform aspects of the present disclosure.

Response generation engine 112 may compare the second sufficiency score from confirmation model 140 to the first sufficiency score produced by speculative retrieval model 130 according to a decision policy. The policy may apply a simple ordering relation, such as accepting the draft context when the second score is greater than or equal to the first score, or a margin-based or adaptive threshold (e.g., derived from latency and/or cost budgets and/or target answer quality). When the condition is met, response generation engine 112 selects the draft context as the generation context and proceeds to generate the response 126 using generative model 150 conditioned on the query and the draft context (e.g., by providing the query and the draft context as inputs to generative model 150 and receiving response 126 as an output from generative model 150). When the condition is not met, response generation engine 112 may invokes retrieval-augmented generation (RAG) engine 170 to perform a comprehensive retrieval process over knowledge corpus 160 (e.g., a conventional RAG process), for example by executing dense vector search to retrieve top-k items for the query and optionally re-ranking candidates with a cross-encoder or semantic similarity model. The resulting alternative context from RAG engine 170 may then be provided to the generative model 150 along with the query as the generation context for use in producing response 126.

RAG engine 170 provides comprehensive retrieval functionality to assemble a generation context from a knowledge corpus when early-exit conditions are not satisfied. In one embodiment, RAG engine 170 executes dense vector search over one or more indices using an encoded representation of the query to identify top-k candidate items, optionally constrained by partitions, recency filters, or metadata predicates. RAG engine 170 may augment dense retrieval with lexical signals, such as term-frequency or best match 25 (BM25) scores, to improve recall for out-of-distribution queries. Retrieved candidates can be re-ranked by a cross-encoder or semantic similarity model to refine ordering, after which a subset may be selected to respect a configured token or item budget. RAG engine 170 may expose an interface to return item identifiers, lightweight summaries, and/or content snippets suitable for conditioning a generative model. RAG engine 170 may support incremental index updates, sharded deployment for high-throughput workloads, telemetry reporting of retrieval features and latencies for downstream auditing and model training, and/or the like.

Generative model 150 may be a language processing model configured to generate text conditioned on a selected context and the user query. When confirmation model 140 and generative model 150 are implemented by a common model, response generation engine 112 first runs a verification pass through the model to obtain the second sufficiency score and subsequently applies a generation pass using the same model parameters if one or more conditions are met, which ensures consistent reasoning between verification and generation. When distinct, confirmation model 140 and generative model 150 may (or may not) share feature encoders and/or normalization layers to maintain alignment of contextual judgments.

The knowledge corpus 160 may be organized into partitions based on domain, recency, or data source. Speculative retrieval model 130 may optionally predict at the partition level before refining to item-level selection when attributes indicate concentrated relevance, thereby reducing index access at early stages. RAG engine 170 may maintain the primary vector indices and may support incremental updates as the corpus evolves. To handle high-throughput workloads, response generation engine 112 may batch multiple verification requests to the confirmation model 140, cache draft contexts for repeated or similar queries, and/or may stream partial responses when generation commences.

Response generation engine 112 may record telemetry for each request 124, including identifiers of knowledge items in the draft and final contexts, the first and second sufficiency scores, the decision outcome, latency components, acceptance or rejection feedback for responses (e.g., response 126) when provided through the user interface 122, and/or the like. These records can be used to retrain or recalibrate speculative retrieval model 130, for example by aligning its predictions to confirmation model 140's judgments and/or downstream user outcomes. Training of speculative retrieval model 130 may be performed offline using logged retrieval and generation traces to mimic top-k behavior of RAG engine 170 and/or to learn calibrated uncertainty at the query and/or item levels, and may optionally be augmented by online updates using acceptance signals derived from user interactions.

Security and governance features may also be implemented within server 110. Response generation engine 112 can authenticate incoming requests 124, enforce access policies to subsets of knowledge corpus 160, redact or mask sensitive fields before presenting response 126, and/or the like.

Through the cooperation of client 120, server 110, and the components of response generation engine 112, the system executes a retrieval-augmented generation workflow that separates fast speculation from verification, selectively invokes comprehensive retrieval, and generates a final response 126 with controlled latency and resource usage. The arrangement shown in FIG. 1 is one non-limiting example; functions of the speculative retrieval model 130, confirmation model 140, generative model 150, RAG engine 170, and knowledge corpus 160 may be combined, distributed, or replicated across machines without departing from the described operation.

Example Efficient Retrieval-Augmented Generation Workflows

Figure 2:
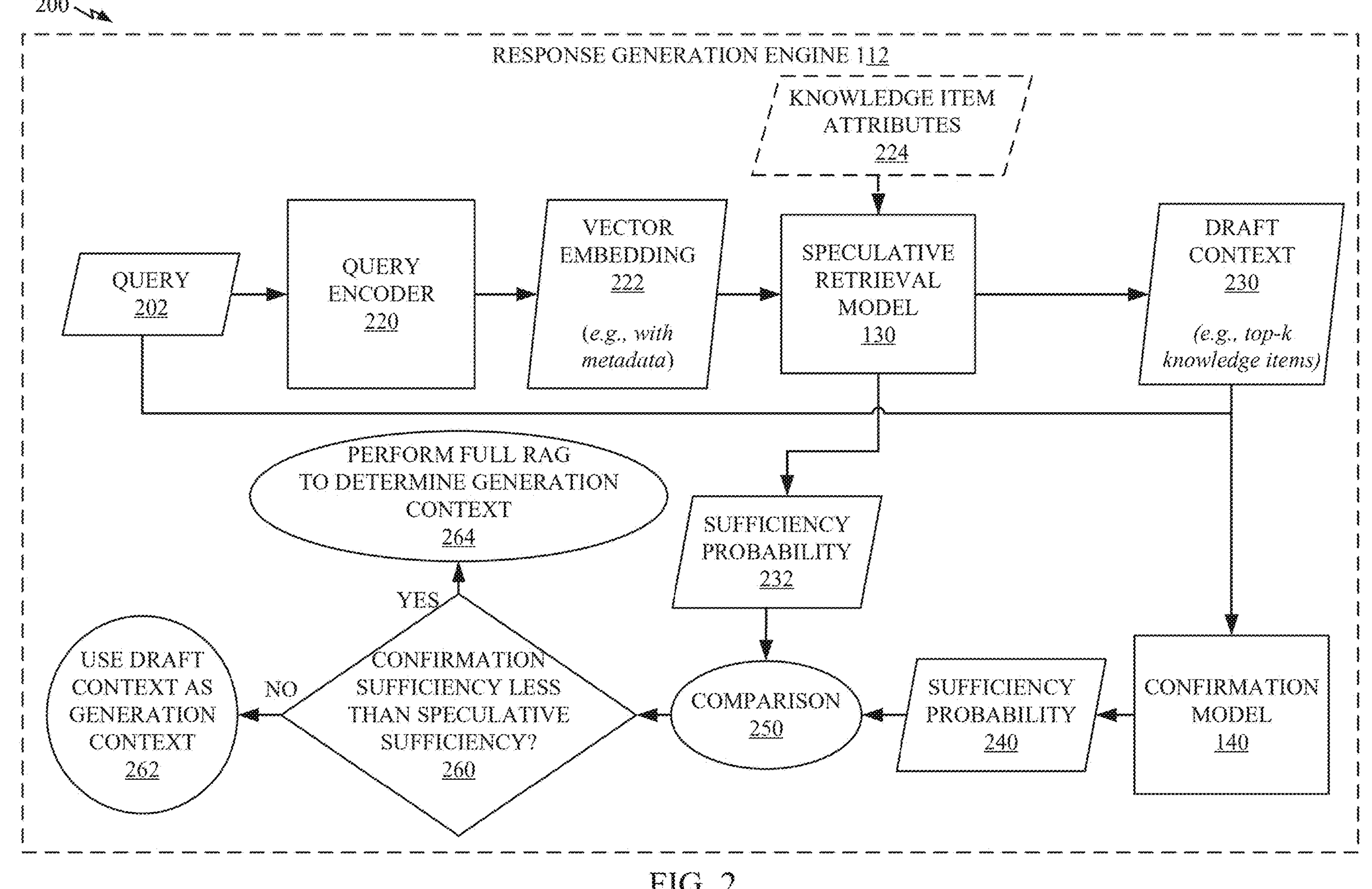
FIG. 2 is a block diagram illustrating a workflow related to efficient retrieval-augmented generation, according to aspects of the present disclosure.

FIG. 2 is a block diagram 200 illustrating a workflow related to efficient retrieval-augmented generation, according to aspects of the present disclosure. Block diagram 200 includes response generation engine 112, speculative retrieval model 130, and confirmation model 140 of FIG. 1.

The workflow performed in block diagram 200 by response generation engine 112 may begin with a user query 202, which may be received and processed by a query encoder 220 that produces a vector embedding 222. User query 202 may be representative of request 124 of FIG. 1.

A vector embedding, or simply embedding, generally refers to a vector representation of an entity (e.g., in this case, a user query) that represents the entity as a vector in n-dimensional space such that similar entities are represented by vectors that are close to one another in the n-dimensional space. Embeddings may be generated through the use of an embedding model, such as a neural network or other type of machine learning model that learns a representation (embedding) for an entity through a training process that trains the neural network based on a data set, such as a plurality of features of a plurality of entities. In one example, an embedding model used to generate embeddings comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating embeddings are possible. An embedding model employed by query encoder 220 may be a pre-trained or domain-adapted embedding machine learning model.

In some embodiments the embedding of the query is computed once and reused across parallel branches of the pipeline to minimize overhead. The embedding may also be associated with metadata derived from the query (e.g., by query encoder 220), such as named entities, temporal expressions, and partition hints, and serves as a compact representation for downstream models. For example, query encoder 220 may be configured to derive such attributes from user query 202, such as using one or more components (e.g., a named entity extraction model or component, a pattern recognition engine, and/or the like).

The vector embedding 222 and associated metadata as appropriate (and, in some cases, lightweight knowledge item attributes 224 such as titles, short snippets, precomputed embeddings, and/or partition identifiers of knowledge items) may be supplied to speculative retrieval model 130. Speculative retrieval model 130 outputs a draft context 230 comprising a subset of candidate knowledge items (e.g., from the knowledge items represented by knowledge item attributes 224) judged most relevant for the query and also outputs a sufficiency probability 232 indicating a likelihood that the draft context is adequate as context for the query. Speculative retrieval model 130 may emit a variable number of items constrained by a configured context budget and may compute internal item-level utilities used to prioritize candidates. Sufficiency probability 232 may be a query-level sufficiency signal that governs early exit.

Draft context 230 is provided, together with the query 202, to confirmation model 140, which operates without initiating additional retrieval or accessing any knowledge items outside the draft context.

In some aspects, the verifier (e.g., confirmation model 140) operates strictly on the same category of lightweight attributes used by the speculative model to avoid bias from richer inputs during verification. For example, confirmation model 140 may receive the query and, for each item in the draft context, only a title and a short snippet or an embeddings-derived summary, and may be constrained from accessing full document text or issuing retrieval calls. This parity of inputs ensures that verification reflects sufficiency judgments over the proposed draft context rather than over additional, previously unexamined corpus content.

In one aspect, confirmation model 140 is conditioned on the query text and, for each candidate knowledge item in the draft context, a title concatenated with a short snippet extracted from the item. In another aspect, the verifier receives the query text and, for each draft item, a title combined with a compact embeddings-derived summary. Both examples bound the sequence length for verification, respect a configured context budget, and exclude access to full document text during the verification pass.

Confirmation model 140 evaluates contextual adequacy and returns a second sufficiency probability 240. In one implementation the confirmation model is a large language model that is also used later for generation, ensuring that its sufficiency assessment has a high level of accuracy and, in some aspects, reflects the behavior of the model that will ultimately produce the answer. In another implementation the confirmation model is a separate verifier (e.g., a large language model or other type of model with a larger number of parameters than speculative retrieval model 130) from the downstream generator.

In certain aspects, confirmation model 140 computes per-item sufficiency probabilities for respective candidate knowledge items included in the draft context. In such a case, a rejection-sampling gate may compare, for each item, the confirmation model's per-item sufficiency probability to a corresponding utility or sufficiency estimate produced by the speculative model for each item. For example, when any confirmation model per-item probability is less than the speculative estimate by at least a configured margin, the pipeline triggers comprehensive retrieval to assemble an alternative context. When all confirmation model per-item probabilities meet or exceed the configured relation to the speculative estimates, the draft context may be accepted for generation. This per-item gate, referred to in some aspects as a large-model rejection sampler, provides document-level control over early exit while preserving query-level accuracy. Other aspects do not involve per-item gating, and only involve query-level sufficiency gating (e.g., as discussed with respect to comparison 250).

At comparison 250, sufficiency probability 232 from the speculative retrieval model and sufficiency probability 240 from the confirmation model are compared to one another. The comparison may involve applying a decision policy to determine whether the confirmation sufficiency is less than the speculative sufficiency as indicated at decision block 260. The relation can be a simple ordering test, an inequality with a margin, an adaptive threshold derived from latency or cost budgets and/or target answer quality, and/or the like. When the confirmation probability is not less than the speculative probability (e.g., or when sufficiency probability 240 is no more than a configured amount below sufficiency probability 232), the pipeline selects the draft context 230 as the generation context at block 262 and proceeds directly to response generation using the selected items and the query. When the confirmation probability is less than the speculative probability (e.g., or when sufficiency probability 240 is more than a configured amount below sufficiency probability 232), the pipeline performs full retrieval to determine a generation context at block 264. In this latter branch a comprehensive retrieval process, such as dense vector search optionally combined with lexical scoring and re-ranking, assembles an alternative context that is then used for generation. The query-level gate may also be referred to in some aspects as a large-model rejection sampler.

The arrangement of FIG. 2 decouples fast proposal from verification and restricts the verifier to the draft context to avoid unnecessary index access during the decision step. By recording the sufficiency probabilities 232 and 240, the draft context 230, and the branch taken at decision block 260, the system can audit outcomes and use acceptance or rejection feedback to refine calibration of the speculative retrieval model. The flow therefore enables safe early exits when the confirmation model agrees with the speculative assessment (e.g., within a configurable margin) and triggers comprehensive retrieval only when the confirmation model's judgment indicates that additional context is warranted. Generation is described in more detail below with respect to FIG. 3.

Figure 3:
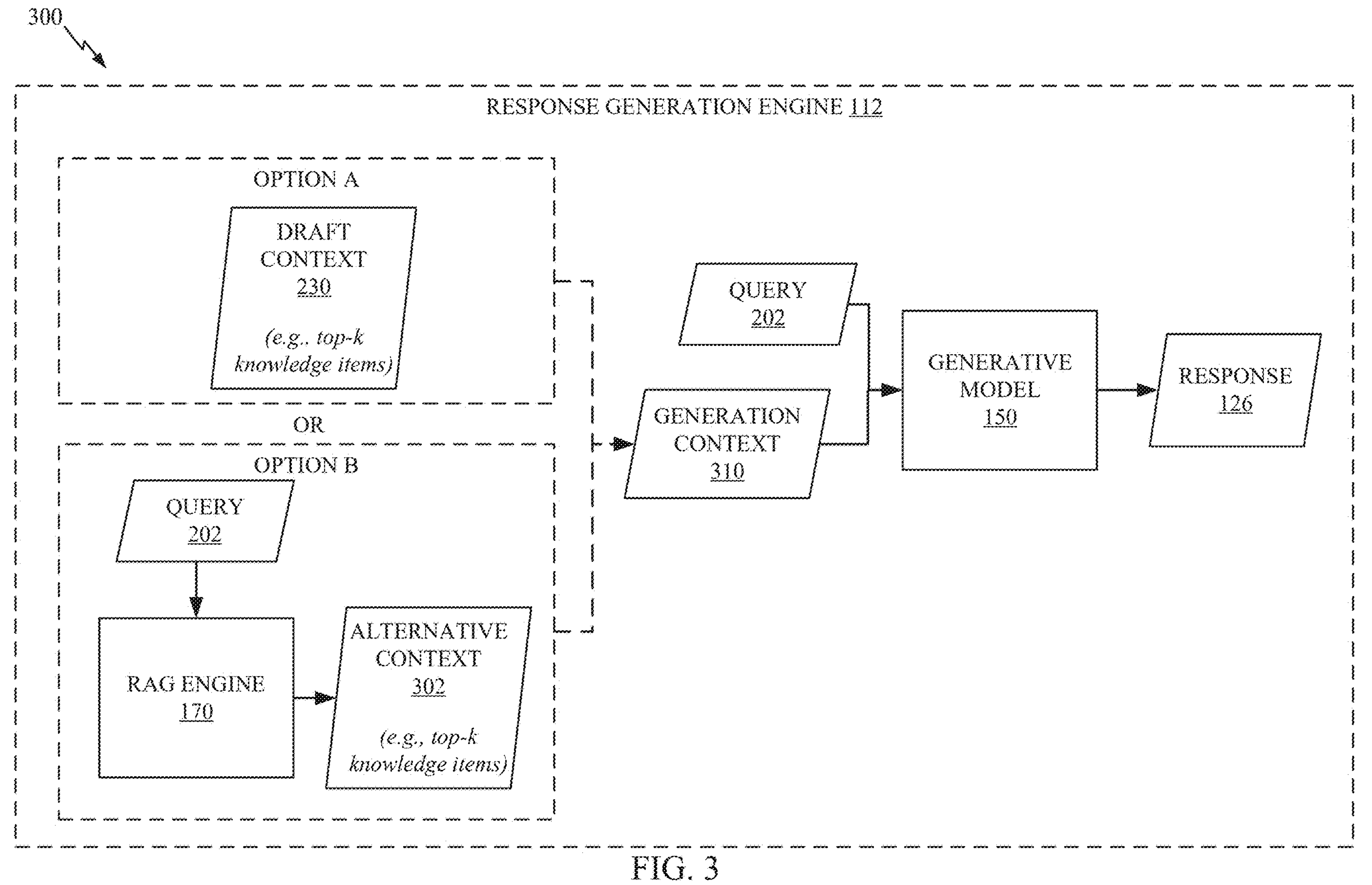
FIG. 3 is a block diagram illustrating an additional workflow related to efficient retrieval-augmented generation, according to aspects of the present disclosure.

FIG. 3 is a block diagram 300 illustrating a workflow related to efficient retrieval-augmented generation, according to aspects of the present disclosure. Block diagram 300 may relate to functionality performed by response generation engine 112 of FIG. 1, and also includes generative model 150, RAG engine 170, and response 126 of FIG. 1 and query 202 and draft context 230 of FIG. 2.

For example, block diagram 300 illustrates a response generation workflow executed within response generation engine 112 after a sufficiency comparison has been performed (e.g., as described above with respect to FIG. 2). Block diagram 300 shows two alternative paths for constructing a generation context 310 that will condition a generative model 150 to produce a response 126. In both paths, the pipeline begins with a query 202 that has already been encoded and evaluated by a speculative proposal stage and a verification stage. Based on that evaluation, response generation engine 112 either accepts a draft context 230 as generation context 310 or triggers a comprehensive retrieval to assemble an alternative context 302 for use as generation context 310. The dashed enclosure indicates that both options operate under the control of the response generation engine 112 and culminate in a common generation and output sequence.

Option A depicts the early-exit branch in which the draft context 230 is accepted as sufficient for the query 202. In this branch, the engine designates the draft context 230 directly as the generation context 310 without further access to the knowledge corpus. The draft context 230 typically includes a compact set of candidate knowledge items, such as top-k items sized to respect a configured token or item budget for the generator. In some aspects, the full documents of the knowledge items indicated in the draft context 230 (e.g., instead of only portions of those knowledge items) are provided as the generation context 310 to generative model 150. Because the draft context is produced by a low-latency speculative model and confirmed by a larger verifier without performing additional retrieval, Option A minimizes end-to-end latency and compute by avoiding index scans, re-ranking, and/or corpus input/output (I/O) at this stage. The query 202 and the generation context 310 are then provided to the generative model 150, which produces the response 126 based on those inputs.

Option B depicts the fallback branch in which the verification result indicates that the draft context is not sufficiently reliable for the query. In this branch, the response generation engine 112 invokes RAG engine 170 to execute comprehensive retrieval over the knowledge corpus. The RAG engine 170 may perform dense vector search and, in some implementations, lexical scoring and cross-encoder re-ranking to identify and order top-k candidate items. From those candidates, the engine assembles the alternative context 302 sized to the same context budget constraints as Option A. In this path, this alternative context 302 is then selected as the generation context 310 and provided along with the query 202 to the generative model 150 for response generation. Because Option B is only taken when the verification judgment calls for additional evidence, the system pays the cost of full retrieval selectively rather than on every request.

In both options, generative model 150 consumes query 202 and generation context 310 to produce response 126. When the verifier and the generator are implemented by the same large language model, response generation engine 112 may execute a verification pass followed by a generation pass using shared parameters, thereby aligning the sufficiency assessment with subsequent reasoning over the same context. When distinct, the verifier and the generator may share tokenization and encoding components to maintain representational compatibility while allowing the generator to apply domain-specific decoding policies. The engine may stream partial tokens of the response 126 once generation begins, and it may enforce a context window limit so that the selected items from either branch fit within decoding constraints.

The workflow may record which option was taken, the identity of items in the generation context 310, latency components, and/or the like for subsequent auditing and training. These records may enable offline or online calibration of the speculative model, refinement of the decision policy that selects between Option A and Option B, monitoring of accuracy and cost tradeoffs, and/or the like. The arrangement shown in FIG. 3 therefore centralizes the final stage of conditioning and generation while cleanly separating the two upstream context-assembly strategies, allowing the system to deliver low-latency answers when the small-model proposal is confirmed and to fall back to comprehensive retrieval only when necessary.

Example Operations Related to Efficient Retrieval-Augmented Generation

Figure 4:
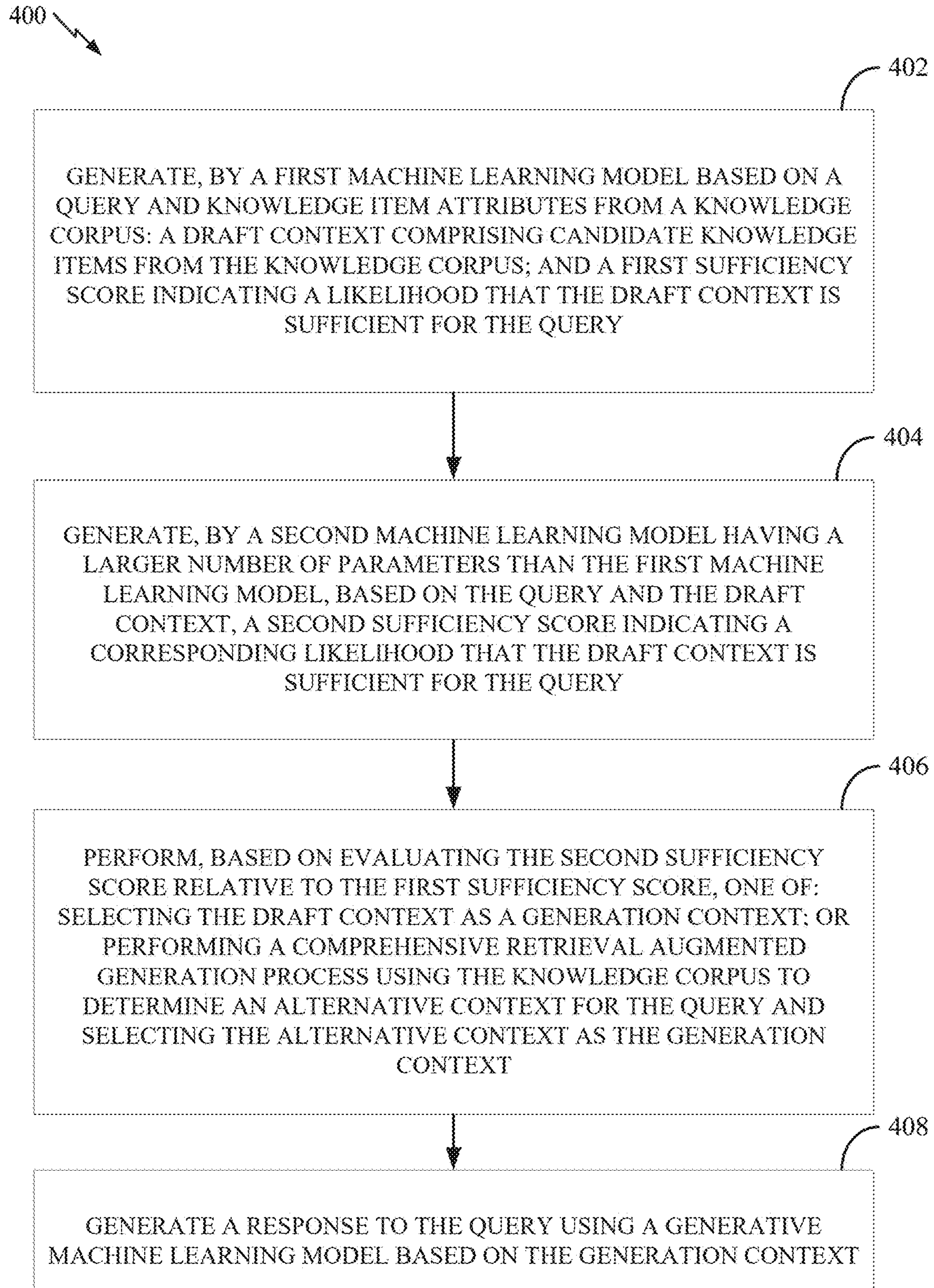
FIG. 4 illustrates example operations related to efficient retrieval-augmented generation, according to aspects of the present disclosure.

FIG. 4 illustrates a flowchart of operations 400 for efficient retrieval-augmented generation, according to aspects of the present disclosure. For example, operations 400 may be performed by one or more components described herein, such as response generation engine 112 of FIG. 1 and/or one or more components of FIGS. 5A and/or 5B described below.

Operations 400 may begin at step 402, with generating, by a first machine learning model based on a query and knowledge item attributes from a knowledge corpus: a draft context comprising candidate knowledge items from the knowledge corpus; and a first sufficiency score indicating a likelihood that the draft context is sufficient for the query.

In some aspects, the knowledge item attributes comprise representations of titles or partial text of the knowledge items, and the generating the draft context is performed using the representations of the titles or the partial text and not using full text of the knowledge items.

In some aspects, the first machine learning model is further configured to generate, for respective candidate knowledge items corresponding to the knowledge item attributes, utility probabilities indicative of expected usefulness for answering the query, and to rank the candidate knowledge items for suitability for inclusion in the draft context based on the utility probabilities.

In certain aspects, the first machine learning model has been trained or configured to mimic top-k results of a primary retriever and to produce calibrated uncertainty for query-level sufficiency and item-level utility.

Some aspects further comprise generating a dense vector representation of the query, wherein the dense vector representation is provided to the first machine learning model, and wherein the first machine learning model generates the draft context and the sufficiency score based on the dense vector representation.

Operations 400 may continue at step 404, with generating, by a second machine learning model having a larger number of parameters than the first machine learning model, based on the query and the draft context, a second sufficiency score indicating a corresponding likelihood that the draft context is sufficient for the query.

In some aspects, the generating the second sufficiency score is performed without accessing portions of the knowledge corpus beyond the draft context.

Operations 400 may continue at step 406, with performing, based on evaluating the second sufficiency score relative to the first sufficiency score, one of: selecting the draft context as a generation context; or performing a comprehensive retrieval augmented generation process using the knowledge corpus to determine an alternative context for the query and selecting the alternative context as the generation context.

In certain aspects, the performing the comprehensive retrieval augmented generation process comprises executing a dense vector search over the knowledge corpus and selecting top-k knowledge items based on vector similarity.

In some aspects, the performing the comprehensive retrieval augmented generation process further comprises re-ranking the selected top-k knowledge items using a cross-encoder or semantic similarity model, and wherein the alternative context is selected based on the re-ranking.

In certain aspects, the selecting the draft context as the generation context occurs when the second sufficiency score is greater than or equal to the first sufficiency score, and the comprehensive retrieval augmented generation process is performed when the second sufficiency score is less than the first sufficiency score by at least a configured margin.

In some aspects, the evaluating the second sufficiency score relative to the first sufficiency score further comprises applying an adaptive threshold determined based on at least one of a latency budget, a cost budget, or a target answer quality.

Operations 400 may continue at step 408, with generating a response to the query using a generative machine learning model based on the generation context.

In some aspects, the second machine learning model is the generative machine learning model, and the generative machine learning model comprises a language processing machine learning model that has been trained through a supervised learning process based on a corpus of natural language data to perform natural language generative tasks.

In some aspects, the first machine learning model is further trained or configured using a feedback signal indicative of acceptance or rejection of the generated response to the query.

Example Processing Systems

Figure 5A:
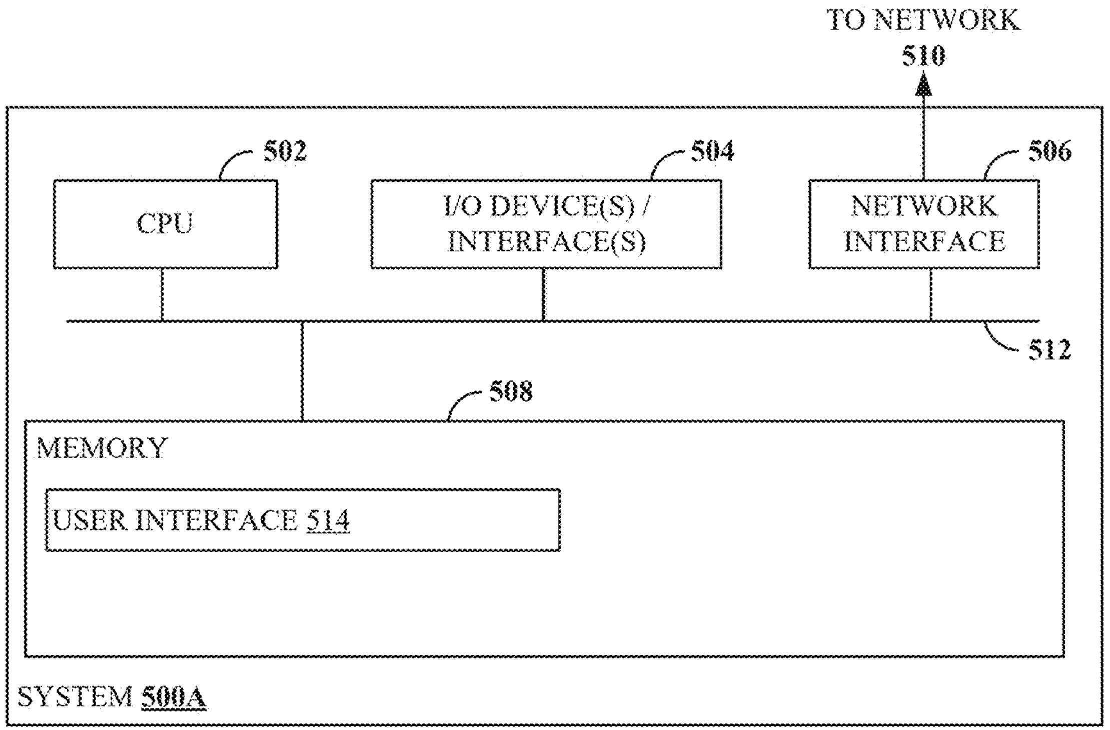
FIG. 5A and FIG. 5B illustrate block diagrams of two computing systems related to efficient retrieval-augmented generation, according to aspects of the present disclosure.

FIG. 5A illustrates an example system 500A with which embodiments of the present disclosure may be implemented. For example, system 500A may be configured to perform aspects of functionality described above with respect to FIGS. 1-4. In one example system 500A corresponds to client 120 of FIG. 1.

System 500A includes a central processing unit (CPU) 502, one or more I/O device interfaces 504 that may allow for the connection of various I/O devices (e.g., keyboards, displays, mouse devices, pen input, etc.) to the system 500A, network interface 506, a memory 508, and an interconnect 512. It is contemplated that one or more components of system 500A may be located remotely and accessed via a network 510. It is further contemplated that one or more components of system 500A may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes a user interface 514, which may be representative of user interface 122 of FIG. 1. For example, a user may interact with user interface 514 to provide input text, submit input text, receive responses, provide feedback with respect to responses, perform other actions based on or in connection with input text and/or responses, and/or the like. For example, user feedback with respect to responses may be used to retrain one or more machine learning models through a supervised learning process for improved performance, such as one or more of machine learning models 556 of FIG. 5B.

Figure 5B:
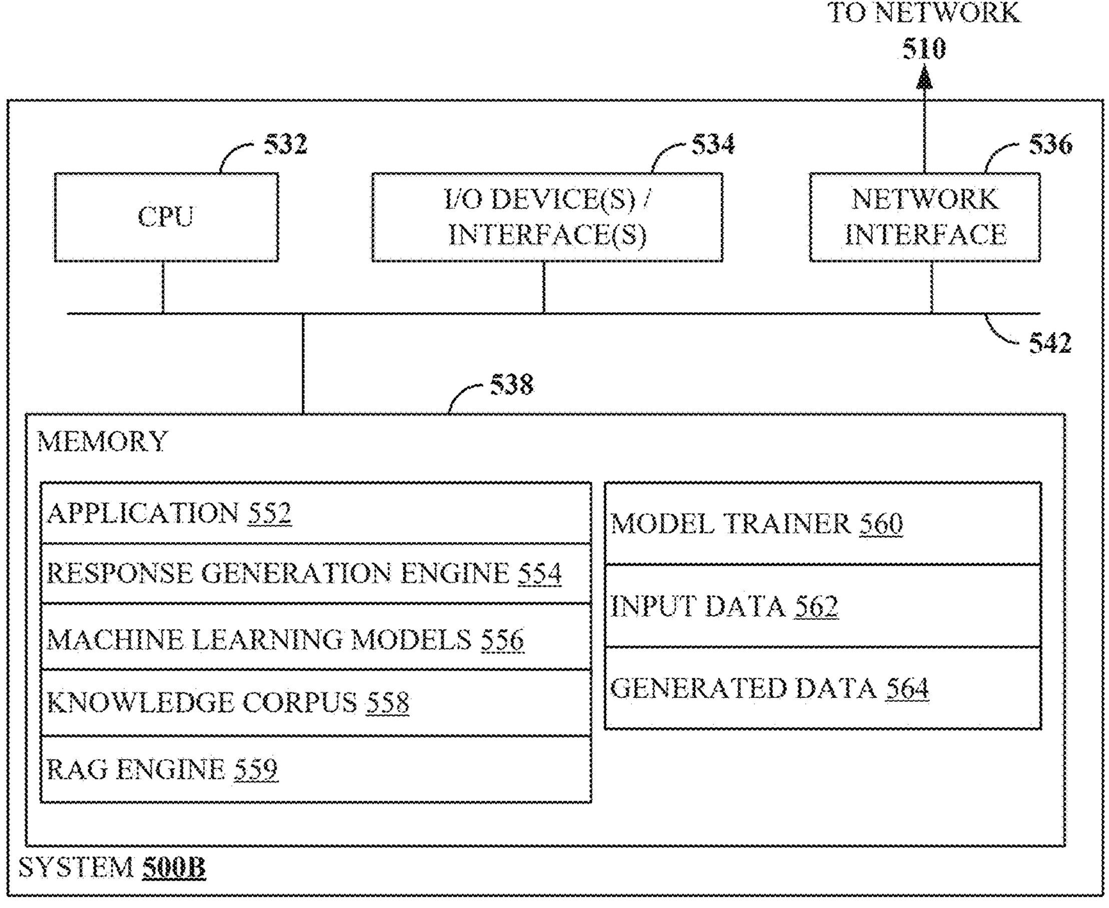

FIG. 5B illustrates another example system 500B with which embodiments of the present disclosure may be implemented. For example, system 500B may correspond to server 110 of FIG. 1.

System 500B includes a CPU 532, one or more I/O device interfaces 534 that may allow for the connection of various I/O devices (e.g., keyboards, displays, mouse devices, pen input, etc.) to the system 500B, network interface 536, a memory 538, and an interconnect 542. It is contemplated that one or more components of system 500B may be located remotely and accessed via a network 510. It is further contemplated that one or more components of system 500B may comprise physical components or virtualized components.

CPU 532 may retrieve and execute programming instructions stored in the memory 538. Similarly, the CPU 532 may retrieve and store application data residing in the memory 538. The interconnect 542 transmits programming instructions and application data, among the CPU 532, I/O device interface 534, network interface 536, and memory 538. CPU 532 is included to be representative of a single CPU, multiple CPUs, a single CPU having multiple processing cores, and other arrangements.

Additionally, the memory 538 is included to be representative of a random access memory or the like. In some embodiments, memory 538 may comprise a disk drive, solid state drive, or a collection of storage devices distributed across multiple storage systems. Although shown as a single unit, the memory 538 may be a combination of fixed and/or removable storage devices, such as fixed disc drives, removable memory cards or optical storage, network attached storage (NAS), or a storage area-network (SAN).

As shown, memory 538 includes an application 552, which may be representative of a computing application that performs language processing functionality, such as an application that includes an AI-assisted conversational system, a chat bot, an automated support feature, or the like. In some aspects, user interface 514 of FIG. 5A provides user interface screens corresponding to application 552.

As shown, memory 538 further includes response generation engine 554, machine learning models 556, knowledge corpus 558, and RAG engine 559, which may be representative of response generation engine 112, one or more machine learning models (e.g., speculative retrieval model 130, confirmation model 140, and/or generative model 150), knowledge corpus 160, and RAG engine 170 of FIG. 1. In some aspects, response generation engine 554 may be part of application 552, or may be separate from application 552. Memory 538 may further include model trainer 560, which may perform aspects related to one or more of machine learning models 556 and/or one or more other machine learning models (e.g., an embedding model, which may also be stored in memory 538). In other aspects, model trainer 560 may be located and executed on a separate system from the system on which such machine learning model(s) are run for use in dynamic response generation.

Memory 538 may further include input data 562, which may include request 124 of FIG. 1, query 202, vector embedding 222, and/or knowledge item attributes 224 of FIG. 2, and/or generation context 310 of FIG. 3, and/or the like. Memory 538 may further include generated data 564, which may include response 126 of FIG. 1, draft context 230, sufficiency probability 232, and/or sufficiency probability 240 of FIG. 2, alternative context 302 and/or response 126 of FIG. 3, and/or the like.

It is noted that systems 500A and 500B are included as examples, and certain functionality described with respect to systems 500A and/or 500B and/or otherwise described herein may be implemented via more or fewer devices and/or components.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for efficient retrieval-augmented generation, comprising:

one or more processors; and a non-transitory computer readable medium storing instructions that, when executed by the one or more processors, cause the system to:

generate, by a first machine learning model based on a query and knowledge item attributes from a knowledge corpus:

a draft context comprising candidate knowledge items from the knowledge corpus; and a first sufficiency score indicating a likelihood that the draft context is sufficient for the query;

generate, by a second machine learning model having a larger number of parameters than the first machine learning model, based on the query and the draft context, a second sufficiency score indicating a corresponding likelihood that the draft context is sufficient for the query;

perform, based on evaluating the second sufficiency score relative to the first sufficiency score, one of:

selecting the draft context as a generation context; or performing a comprehensive retrieval augmented generation process using the knowledge corpus to determine an alternative context for the query and selecting the alternative context as the generation context; and generate a response to the query using a generative machine learning model based on the generation context, wherein the second machine learning model is the generative machine learning model, and wherein the generative machine learning model comprises a language processing machine learning model that has been trained through a supervised learning process based on a corpus of natural language data to perform natural language generative tasks.

2. The system of claim 1, wherein the first machine learning model is further configured to generate, for respective candidate knowledge items corresponding to the knowledge item attributes, utility probabilities indicative of expected usefulness for answering the query, and to rank the candidate knowledge items for suitability for inclusion in the draft context based on the utility probabilities.

3. The system of claim 1, wherein the knowledge item attributes comprise representations of titles or partial text of the knowledge items, and wherein the generating the draft context is performed using the representations of the titles or the partial text and not using full text of the knowledge items.

4. The system of claim 1, wherein the generating the second sufficiency score is performed without accessing portions of the knowledge corpus beyond the draft context.

5. The system of claim 1, wherein the performing the comprehensive retrieval augmented generation process comprises executing a dense vector search over the knowledge corpus and selecting top-k knowledge items based on vector similarity.

6. The system of claim 5, wherein the performing the comprehensive retrieval augmented generation process further comprises re-ranking the selected top-k knowledge items using a cross-encoder or semantic similarity model, and wherein the alternative context is selected based on the re-ranking.

7. The system of claim 1, wherein the first machine learning model has been trained or configured to mimic top-k results of a primary retriever and to produce calibrated uncertainty for query-level sufficiency and item-level utility.

8. The system of claim 7, wherein the first machine learning model is further trained or configured using a feedback signal indicative of acceptance or rejection of the generated response to the query.

9. The system of claim 1, wherein the instructions, when executed by the one or more processors, further cause the system to generate a dense vector representation of the query, wherein the dense vector representation is provided to the first machine learning model, and wherein the first machine learning model generates the draft context and the sufficiency score based on the dense vector representation.

10. The system of claim 1, wherein the selecting the draft context as the generation context occurs when the second sufficiency score is greater than or equal to the first sufficiency score, and wherein the comprehensive retrieval augmented generation process is performed when the second sufficiency score is less than the first sufficiency score by at least a configured margin.

11. The system of claim 1, wherein the evaluating the second sufficiency score relative to the first sufficiency score further comprises applying an adaptive threshold determined based on at least one of a latency budget, a cost budget, or a target answer quality.

12. A method for efficient retrieval-augmented generation, comprising:

generating, by a first machine learning model based on a query and knowledge item attributes from a knowledge corpus:

a draft context comprising candidate knowledge items from the knowledge corpus; and a first sufficiency score indicating a likelihood that the draft context is sufficient for the query;

generating, by a second machine learning model having a larger number of parameters than the first machine learning model, based on the query and the draft context, a second sufficiency score indicating a corresponding likelihood that the draft context is sufficient for the query;

performing, based on evaluating the second sufficiency score relative to the first sufficiency score, one of:

selecting the draft context as a generation context; or performing a comprehensive retrieval augmented generation process using the knowledge corpus to determine an alternative context for the query and selecting the alternative context as the generation context; and generating a response to the query using a generative machine learning model based on the generation context, wherein the second machine learning model is the generative machine learning model, and wherein the generative machine learning model comprises a language processing machine learning model that has been trained through a supervised learning process based on a corpus of natural language data to perform natural language generative tasks.

13. The method of claim 12, wherein the first machine learning model is further configured to generate, for respective candidate knowledge items corresponding to the knowledge item attributes, utility probabilities indicative of expected usefulness for answering the query, and to rank the candidate knowledge items for suitability for inclusion in the draft context based on the utility probabilities.

14. The method of claim 12, wherein the knowledge item attributes comprise representations of titles or partial text of the knowledge items, and wherein the generating the draft context is performed using the representations of the titles or the partial text and not using full text of the knowledge items.

15. The method of claim 12, wherein the generating the second sufficiency score is performed without accessing portions of the knowledge corpus beyond the draft context.

16. The method of claim 12, wherein the performing the comprehensive retrieval augmented generation process comprises executing a dense vector search over the knowledge corpus and selecting top-k knowledge items based on vector similarity.

17. The method of claim 16, wherein the performing the comprehensive retrieval augmented generation process further comprises re-ranking the selected top-k knowledge items using a cross-encoder or semantic similarity model, and wherein the alternative context is selected based on the re-ranking.

18. A non-transitory computer readable medium comprising instructions that, when executed by one or more processors of a computing system, cause the computing system to:

generate, by a first machine learning model based on a query and knowledge item attributes from a knowledge corpus:

a draft context comprising candidate knowledge items from the knowledge corpus; and a first sufficiency score indicating a likelihood that the draft context is sufficient for the query, wherein the first machine learning model has been trained or configured to mimic top-k results of a primary retriever and to produce calibrated uncertainty for query-level sufficiency and item-level utility;

generate, by a second machine learning model having a larger number of parameters than the first machine learning model, based on the query and the draft context, a second sufficiency score indicating a corresponding likelihood that the draft context is sufficient for the query;

perform, based on evaluating the second sufficiency score relative to the first sufficiency score, one of:

selecting the draft context as a generation context; or performing a comprehensive retrieval augmented generation process using the knowledge corpus to determine an alternative context for the query and selecting the alternative context as the generation context; and generate a response to the query using a generative machine learning model based on the generation context.

* * * * *